3,091,607
POLYMERISATION OF ETHYLENE WITH A CATALYST ALUMINUM, A HALIDE OF TITANIUM OR VANADIUM AND A HALOGEN
Alaric Louis Jeffrey Raum, Teddington, England, assignor to The Distillers Company Limited, Edinburgh, Scotland, a British company
No Drawing. Filed July 6, 1959, Ser. No. 824,936
Claims priority, application Great Britain July 18, 1958
18 Claims. (Cl. 260—94.9)

The present invention relates to a process for the production of solid, substantially linear, high molecular weight polymers and copolymers of ethylene and to the catalysts used in said process.

It is known that ethylene can be polymerised and copolymerised to give solid, substantially linear, high molecular weight polymers by employing a catalyst system obtained by mixing certain organic compounds of metals occurring in the first three groups of the periodic table with compounds of a metal occurring in the (a) subgroups of groups IV to VI of the periodic table. This type of polymerisation has become known as "Ziegler" polymerisation after its discoverer, Professor Ziegler.

The "Ziegler" polymerisation process can be made to give excellent yields of high grade polyethylene under suitable conditions, but it has the disadvantage that the most effective catalyst systems involve the use of organometallic compounds which are very highly reactive and often dangerous to employ.

An object of the present invention is to provide a general process for the production of substantially linear, high molecular weight polyethylene and copolymers of ethylene which does not involve the use of organo-metallic compounds as added components of the catalyst system. A further object is to provide a process for the polymerisation and copolymerisation of ethylene which can be carried out by mixing entirely inorganic catalyst components with ethylene in an inert liquid medium. A further object is to provide a process for the production of substantially linear polymers of ethylene which have particularly high molecular weights and consequently have excellent physical properties.

According to the present invention the process for the polymerisation or copolymerisation of ethylene comprises subjecting the ethylene in a liquid vehicle to an elevated temperature and an elevated pressure in the presence of a three component catalyst system formed from (1) aluminum, (2) a titanium di- or trihalide, a vanadium trihalide or mixtures thereof and (3) a halogen, an inter-halogen compound or mixtures thereof.

The aluminum is present as such or mixed with another metal in the form of an alloy. It is preferably present in a finely divided form, i.e. a form which provides a comparatively large surface area of metal for the amount taken. Most suitably aluminum powder or flitter is used and it is particularly advantageous to use ultra fine aluminum powder which has an average particle size of approximately 0.03 micron. The aluminum employed can be in an activated form. By activated is meant that the aluminum has been subjected to a final treatment in the absence of molecular oxygen which either removed, absorbed or chemically combined oxygen from the metal, or formed new metallic surfaces by mechanical or chemical action. Subsequent to its final treatment, the activated metal retains its activity, provided that it is not allowed to come in contact with sufficient oxygen to inactivate all its oxygen-free surfaces formed by the treatment.

The preferred second components of the catalyst systems are the titanium and vanadium trichlorides. Titanium trichloride as normally prepared is in the form of a black or violet powder and such material, which is commercially available, can be used directly in the process of the present invention as can commercially available vanadium trichloride. Titanium trichloride can also be used in its metastable state in which it is in the form of a brown powder. Metastable titanium trichloride can be formed as a finely divided powder by passing titanium tetrachloride and hydrogen through a silent electric discharge at room temperature. The metastable titanium trichloride formed in this way is metastable because it is converted irreversibly to the black or violet stable form by the action of heat, for instance by heating to a temperature above 200° C.

Halogens, such as chlorine, bromine and iodine, and inter-halogen compounds, such as iodine monochloride or iodine trichloride, can be employed in the process of the present invention.

The quantities of the aluminum and the titanium or vanadium halides can be varied considerably without preventing polymerisation taking place, but preferably the molar proportion of aluminum present amounts to at least one-fifth of the molar quantity of titanium or vanadium halide used.

There is no upper limit to the amount of aluminum present in the catalyst mixture and good yields of polymer can be obtained from catalyst mixtures containing as much as 30 molar proportions of aluminum to each molar proportion of titanium or vanadium halide. However, it is undesirable to increase the amount of aluminum to such an extent that considerable quantities of aluminum are left in the polyethylene with all the consequent difficulties of removal. Generally it is unnecessary to employ more than 5 molar proportions of aluminum to each molar proportion of titanium or vanadium halide. It is preferred that the molar proportion of aluminum to titanium or vanadium halide should lie in the range 1:1 to 5:1.

It is an essential feature of the present invention that a halogen or an inter-halogen compound should be present in the reaction medium. In its absence little or no polymerisation occurs, but only small quantities are required to render the system active. The halogen or the inter-halogen compound is thus an activator for the other catalyst components. Most suitably, the halogen or inter-halogen compound should be present in the proportion of 0.1 to 2 mols thereof per mol of titanium or vanadium halide.

The process of the present invention is carried out with the various components of the reaction mixture dispersed throughout a liquid vehicle. Good dispersion aids the polymerisation and preferably the reaction vessel is fitted with an efficient stirring mechanism. Any liquid vehicle which does not inhibit the polymerisation reaction can be employed and liquids which are solvents for ethylene are preferred. The most suitable liquid vehicles are the normal paraffins, such as n-pentane, n-hexane and n-decane, and higher boiling petroleum fractions and cycloaliphatic compounds, such as cyclohexane. Aromatic compounds, such as benzene and toluene, may also be used.

The aluminum, the titanium or vanadium halides and the halogen or inter-halogen can be added separately to the reaction mixture and mixed together at the start of the polymerisation reaction. Alternatively, these three components or any two of them can be mixed together before attempting any polymerisation. Such premixing can be carried out, for example, in a ball mill, preferably in the presence of an inert liquid or gas. If desired the premixed catalyst components can be heated together before being brought into contact with ethylene. Any liquid used as a vehicle in which to carry out premixing of the catalyst components is preferably the same liquid as that to be used for the polymerisation reaction. The process of the present invention can advantageously be carried out by first mixing the titanium or vanadium halides and the halogen or inter-halogen compound either in the presence or absence of the ethylene and then adding aluminum powder.

The charging of the reaction vessel with the various ingredients of the reaction mixture and the subsequent polymerisation is preferably carried out in the absence of carbon dioxide, carbon monoxide, acetylene and water. In the process of the present invention trace quantities of these compounds can be tolerated but large quantities of any of them must be avoided. Most suitably the charging of the reaction vessel is carried out in an atmosphere of an inert gas, for example nitrogen or argon, or under an atmosphere of ethylene.

Most suitably the polymerisation process is carried out in the absence of oxygen but it is unnecessary to remove all oxygen from the ingredients of the reaction mixture and in particular from the ethylene, because the presence of this gas in the reaction mixture in small concentrations does not prevent the polymerisation of ethylene taking place.

The polymerisation of ethylene according to the present invention is most suitably initiated by increasing the temperature and/or pressure of the ethylene in the reaction vessel until polymerisation occurs. The precise conditions under which polymerisation commences vary widely according to the components of the reaction mixture.

Once polymerisation has begun the temperature and pressure of the reaction mixture may be suitably maintained at a constant level, the pressure preferably being maintained by the addition of more ethylene. Suitable temperatures for polymerisation are between 70 and 200° C. Good results are obtained by carrying out the reaction at a temperature between 90 and 180° C., particularly between 110 and 160° C. It is possible, and in some cases advantageous, to initiate the polymerisation at a comparatively high temperature, for instance 160 to 200° C., and then allow the polymerisation to continue at a lower temperature, for instance 70 to 110° C.

The reaction may be carried out at elevated, i.e. super-atmospheric pressures, less than 150 pounds per square inch, but it is generally preferred that pressures between 150–1,000 pounds per square inch be employed. It is also possible, and for some purposes advantageous, to initiate the polymerisation at a comparatively high pressure, for example greater than 500 pounds per square inch, and then continue the reaction at a lower pressure.

The procedure in which high initial temperatures and pressures are employed is particularly useful on an industrial scale when the reaction is carried out in a series of reaction vessels at decreasing pressures and/or temperatures.

The use of pure ethylene gives rise to excellent homopolymers according to the process of the present invention. The term "pure" as used in connection with ethylene as a starting material for the polymerisation process of the present invention is intended to convey that there is a substantial absence of other olefins, oxygen, carbon dioxide and water, but if desired the ethylene may be replaced by a mixture of ethylene with other normally gaseous hydrocarbons. The gaseous hydrocarbons may contain other α-olefins, such as propylene or 1-butene, when copolymers will be formed. It should be noted that if copolymers of ethylene and other α-olefins are to be prepared according to the process of the present invention, it is often necessary to employ a much higher concentration of the other α-olefin than ethylene in the feed to the polymerisation vessel than would be indicated by the composition it is desired that the copolymer should possess. This is necessary in order to allow for the fact that ethylene copolymerises rather more rapidly under the conditions of the process of the present invention than do other α-olefins such, for example, as propylene.

The molecular weight of the polymers and copolymers of ethylene produced according to the present invention is high and the products are solids. The average molecular weight of a copolymer or polymer depends on the polymerisation conditions employed and the components of the catalyst system. Catalyst systems containing vanadium trichloride give rise to homopolymers of ethylene having exceedingly high molecular weights and substantially no material of low molecular weight is produced. A preferred catalyst system for the production of particularly useful, high molecular weight homopolymers of ethylene consists of aluminum, vanadium trichloride and iodine or iodine monochloride.

The process of the present invention is particularly valuable because it can be used to produce polyethylene or copolymers of ethylene having a molecular weight range which renders them of particular value in the production of moulding compositions and the like.

The isolation of the polymers and copolymers may be carried out by any of the methods described in the literature. In particular it is preferred to wash the polymer with an alcohol, such as ethanol or propanol, before it is allowed to come into contact with air. It is also preferred to treat the polymer with a mineral acid, such as hydrochloric acid. It is often advantageous to treat the product at reflux temperature with an alcoholic/hydrochloric acid mixture, followed by a washing stage with the alcohol alone.

The following examples illustrate the process of the present invention, the parts by weight (p.b.w.) and the parts by volume (p.b.v.) bearing the same relationship to each other as kilograms to litres. The polymerisations were carried out in a stainless steel high pressure reactor having a capacity of 800 p.b.v. and fitted with a magnetically operated stirrer. The ethylene used contained between 2 to 14 p.p.m. of oxygen. The inherent viscosities of the polymers given in the examples are expressed as $$\eta_I = \frac{1}{C} \log_e \frac{tc}{to}$$

where C is the concentration of polymer in grams per 100 millilitres at 20° C.; $tc$ is the flow time of the polymer solution at 125° C. in seconds and $to$ is the flow time of the pure solvent at 125° C. The viscosity measurements were made in a 0.15% w./v. solution of polymer in tetralin at 125° C.

*Example 1*

0.95 p.b.w. of vanadium trichloride, 0.48 p.b.w aluminum, which had been milled for 18 hours under cyclohexane in the absence of oxygen, and 300 p.b.v. of dry cyclohexane were added to the reactor which had been purged with nitrogen. The reactor was then flushed with substantially pure ethylene and 6.2 p.b.v. of a solution of 1.98 p.b.w. of iodine monochloride in 25 p.b.v. of cyclohexane added. The ethylene pressure was then raised to 160 lbs./sq. in. at rom temperature and stirring was commenced. Heat was then applied to the reactor, the temperature being raised to 140° C. and the pressure to 440 lbs./sq. in. The reaction was then continued under these constant conditions, more ethylene being admitted as necessary, so that the total time at which the reactor was at a temperature greater than 100° C. was 180 minutes.

After the reaction the polymer was removed from the reactor, macerated to fine particles and treated with ethanolic hydrochloric acid at the reflux temperature followed by washing with pure ethanol. 44.0 p.b.w of high molecular weight, linear polyethylene, having a $\eta_I$ value of 3.277, was obtained.

*Example 2*

A copolymerisation reaction was carried out using the procedure described in Example 1, but the ethylene was replaced with an approximately equimolar mixture of propylene and ethylene. The maximum pressure in the system was 810 p.s.i.g., 30.5 p.b.w. of an ethylene/proylene copolymer, having a $\eta_I$ value of 2.682, was obtained.

*Example 3*

The procedure of Example 1 was repeated using a catalyst system formed from (a) 0.48 p.b.w. of aluminum, (b) 0.49 p.b.w. of iodine monochloride and (c) 0.90 p.b.w. of titanium trichloride; the molar ratio of (a):(b):(c) being 3:0.5:1. 153.5 p.b.w. of polyethylene having a $\pi_I$ value of 0.80 was obtained.

*Example 4*

The procedure of Example 1 was repeated using a catalyst system formed from (a) 0.48 p.b.w. of aluminum, (b) 0.38 p.b.w. of iodine and (c) 0.93 p.b.w. of titanium trichloride, replacing the ethylene with an approximately equimolar mixture of ethylene and propylene. The pressure in the polymerisation apparatus rose to 690 p.s.i. when the reactor was heated to 140° C. No further monomer was added during this polymerisation. The reaction vessel was maintained at 140° C. so that the total time for which the reaction temperature was greater than 100° C. was 180 minutes. A yield of 43 p.b.w. of copolymer having a $\eta_I$ value of 1.625 was obtained.

*Example 5*

The procedure of Example 1 was repeated using a catalyst system formed from (a) 0.24 p.b.w. of aluminum, (b) 0.76 p.b.w. of iodine and (c) 0.48 p.b.w. of vanadium trichloride, the molar ratio of (a):(b):(c) being 3:2:1. Ethylene was admitted to a pressure of 250 lbs./sq. in. and the temperature raised to 100° C., the pressure then being adjusted to 400 lbs./sq. in. at which level it was maintained throughout the polymerisation period of 3 hours. An excellent yield of high molecular weight, linear polyethylene was obtained.

*Example 6*

The procedure of Example 1 was repeated using a catalyst system formed from (a) 0.48 p.b.w. of aluminum, (b) 0.38 p.b.w. of iodine and (c) 0.95 p.b.w. of vanadium trichloride, the molar ratio of (a):(b):(c) being 3:0.5:1. A yield of 28.0 p.b.w. of polyethylene having a $\eta_I$ value of 2.366 was obtained.

*Example 7*

The procedure of Example 1 was repeated using a catalyst system formed from (a) 0.49 p.b.w. of aluminum (b) 75 p.b.w. of chlorine (measured at atmospheric pressure and 30° C.) and (c) 0.95 p.b.w. of vanadium trichloride. The pressure in the reaction vessel was maintained at 550 p.s.i.g. and the reaction mixture was held at 140° C. for a period so that the total time at which it was greater than 100° C. was 240 minutes. A small yield of polymer was obtained.

*Example 8*

The general procedure of Example 1 was repeated using a catalyst system formed from (a) 0.48 p.b.w. of aluminum, (b) 0.38 p.b.w. of iodine and (c) 0.93 p.b.w. of titanium trichloride. The molar ratio of (a):(b):(c) was 3:0.5:1. The pressure in the reaction vessel was raised to 650 p.s.i.g. and the temperature to 118° C. when rapid polymerisation commenced and the exothermic nature of the polymerisation reaction raised the temperature of the reaction mixture to 150° C. After the reaction mixture had been at a temperature above 100° C. for 60 minutes, the polymerisation was stopped and 105.5 p.b.w. of polyethylene having a $\eta_I$ value of 1.401 was recovered.

*Example 9*

The general procedure of Example 1 was repeated using a catalyst system formed from (a) 0.49 p.b.w. of aluminum, (b) 0.76 p.b.w. of iodine and (c) 0.71 p.b.w. of titanium dichloride, the molar ratio of (a):(b):(c) being 3:1:1. 34.0 p.b.w. of high molecular weight linear polyethylene was obtained after 240 minutes above 100° C.

The following examples illustrate the preparation of polymers according to the present invention from relatively impure ethylene having an analysis:

| | Percent |
|---|---|
| Ethylene | 87.2 |
| Hydrogen | 1.5 |
| Methane | 3.3 |
| Ethane | {2.1 / 3.0} |
| Butene-1 | 1.2 |
| Butane | 0.1 |
| Butadiene | 0.5 |
| Hydrocarbons with more than 4 carbon atoms | 1.5 |

*Example 10*

0.55 p.b.w. of aluminum, 1.04 p.b.w. of titanium trichloride, and 300 p.b.v. of dry cyclohexane were then added to the reactor which had been purged with nitrogen. The reactor was then flushed with ethylene and 40 p.b.v. of chlorine added (30° C./755 millimetres of mercury). The ethylene pressure was then raised to 250 lbs./sq. in. at room temperature and stirring was commenced. Heat was then applied to the reactor, the temperature being raised to 140° C. and the pressure to 650 lbs./sq. in. The reaction was then continued under these constant conditions, more ethylene being admitted as necessary, so that the total time at which the reactor was at a temperature greater than 100° C. was 180 minutes.

After the reaction the polymer was removed from the reactor, macerated to fine particles and treated with ethanolic hydrochloric acid at the reflux temperature followed by washing with pure boiling ethanol.

8 p.b.w. of high molecular weight polymer was obtained. The impact strength by the Charpy method was found to be $>100 \times 10^6$ erg./cm.$^2$.

*Example 11*

A polymerisation was carried out using conditions similar to those in Example 10, employing as catalyst a mixture of 0.56 p.b.w. aluminum flitters, 1.07 p.b.w. of titanium trichloride and 7.360 p.b.w. iodine in 300 p.b.v. cyclohexane. 39.5 p.b.w. of high molecular weight polymer having a $\eta_I$ value of 1.493 was obtained.

*Example 12*

A polymerisation was carried out as described in Example 10 in which the reactor was charged with 0.55 p.b.w. of aluminum flitters, 1.06 p.b.w. of titanium trichloride, 0.55 p.b.w. of bromine and 300 p.b.v. of cyclohexane. 46 p.b.w. of high molecular weight polymer having a $\eta_I$ value of 1.708 was obtained.

Substantially similar results to those given above are obtained when any of the above procedures are repeated using any of the aforementioned liquid vehicles. Similar results are also obtained when the titanium trichloride or vanadium trichloride of appropriate examples is replaced with an equivalent quantity of the corresponding bromide or iodide.

I claim:

1. A process which comprises subjecting ethylene in a liquid vehicle to an elevated temperature, an elevated pressure and an inorganic activated catalyst system formed in a liquid vehicle from components (a) aluminum, (b) at least one member selected from the group consisting of titanium dihalide, titanium trihalide and vanadium trihalide and (c) an activator therefor, the activator being at least one member selected from the group consisting of halogen and an interhalogen compound.

2. A process which comprises subjecting ethylene in a liquid vehicle to an elevated temperature, an elevated pressure and an inorganic activated catalyst system formed in a liquid vehicle from components (a) aluminum, (b) at least one member selected from the group consisting of titanium dihalide, titanium trihalide and vanadium trihalide and (c) an activator therefor, the activator being at least one member selected from the group consisting of halogen and an interhalogen compound, the initial molar proportion of component (a) to component (b) being in the range of from 1:1 to 5:1.

3. A process which comprises subjecting ethylene in a liquid vehicle to an elevated temperature, an elevated pressure and an inorganic activated catalyst system formed in a liquid vehicle from components (a) aluminum, (b) at least one member selected from the group consisting of titanium dihalide, titanium trihalide and vanadium trihalide and (c) an activator therefor, the activator being at least one member selected from the group consisting of halogen and an interhalogen compound, the initial proportion of component (c) being from 0.1 to 1 mol thereof per mol of component (b).

4. A process which comprises subjecting ethylene in a liquid vehicle to a temperature in the range from 90° C. to 180° C., an elevated pressure and an inorganic activated catalyst system formed in a liquid vehicle from components (a) aluminum, (b) at least one member selected from the group consisting of titanium dihalide, titanium trihalide and vanadium trihalide and (c) an activator therefor, the activator being at least one member selected from the group consisting of halogen and an interhalogen compound.

5. A process which comprises subjecting ethylene in a liquid vehicle to an elevated temperature, an elevated pressure and an inorganic activated catalyst system formed in a liquid vehicle from components (a) aluminum, (b) vanadium trichloride and (c) an activator therefor, the activator being iodine monochloride.

6. A process which comprises subjecting ethylene in a liquid vehicle to an elevated temperature, an elevated pressure and an inorganic activated catalyst system formed in a liquid vehicle from components (a) aluminum, (b) titanium trichloride and (c) an activator therefor, the activator being at least one member selected from the group consisting of halogen and an interhalogen compound.

7. A process which comprises subjecting ethylene in a liquid vehicle to an elevated temperature, an elevated pressure and an inorganic activated catalyst system formed in a liquid vehicle from components (a) aluminum, (b) vanadium trichloride and (c) an activator therefor, the activator being at least one member selected from the group consisting of halogen and an interhalogen compound.

8. An inorganic polymerization catalyst formed in a liquid vehicle from (a) aluminum, (b) at least one member selected from the group consisting of titanium dihalide, titanium trihalide and vanadium trihalide and (c) an activator therefor, the activator being at least one member selected from the group consisting of halogen and an interhalogen compound, and the initial molar ratio of $a:b$ being in the range of from 0.2:1 to 30:1.

9. A process which comprises contacting ethylene in a liquid vehicle and under polymerization conditions with an inorganic activated catalyst system formed in a liquid vehicle from components (a) aluminum, (b) at least one member selected from the group consisting of titanium dihalide, titanium trihalide and vanadium trihalide and (c) an activator therefor, the activator being at least one member selected from the group consisting of halogen and an interhalogen compound, and the initial molar ratio of $a:b$ being in the range of from 0.2:1 to 30:1.

10. In the process of polymerizing ethylene in a liquid vehicle and with an inorganic catalyst, the improvement wherein the catalyst is formed in a liquid vehicle from (a) aluminum, (b) at least one member selected from the group consisting of titanium dihalide, titanium trihalide and vanadium trihalide and (c) an activator therefor, the activator being at least one member selected from the group consisting of halogen and an interhalogen compound, and the initial molar ratio of $a:b$ being in the range of from 0.2:1 to 30:1.

11. An inorganic polymerization catalyst formed in a liquid vehicle from (1) aluminum, (2) titanium trichloride and (3) an activator therefor, the activator being iodine, and the initial molar ratio of aluminum to titanium trichloride being in the range of from 0.2:1 to 30:1.

12. An inorganic polymerization catalyst formed in a liquid vehicle from (1) aluminum, (2) titanium trichloride and (3) an activator therefor, the activator being iodine monochloride, and the initial molar ratio of aluminum to titanium trichloride being in the range of from 0.2:1 to 30:1.

13. An inorganic polymerization catalyst formed in a liquid vehicle from (1) aluminum, (2) vanadium trichloride and (3) an activator therefor, the activator being iodine, and the initial molar ratio of aluminum to vanadium trichloride being in the range of from 0.2:1 to 30:1.

14. An inorganic polymerization catalyst formed in a liquid vehicle from (1) aluminum, (2) vanadium trichloride and (3) an activator therefor, the activator being chlorine, and the initial molar ratio of aluminum to vanadium trichloride being in the range of from 0.2:1 to 30:1.

15. An inorganic polymerization catalyst formed in a liquid vehicle from (1) aluminum, (2) titanium dichloride and (3) an activator therefor, the activator being iodine, and the initial molar ratio of aluminum to titanium dichloride being in the range of from 0.2:1 to 30:1.

16. An inorganic polymerization catalyst formed in a liquid vehicle from (1) aluminum, (2) titanium trichloride and (3) an activator therefor, the activator being chlorine, and the initial molar ratio of aluminum to titanium trichloride being in the range of from 0.2:1 to 30:1.

17. An inorganic polymerization catalyst formed in a liquid vehicle from (1) aluminum, (2) titanium trichloride and (3) an activator therefor, the activator being bromine, and the initial molar ratio of aluminum to titanium trichloride being in the range of from 0.2:1 to 30:1.

18. An inorganic polymerization catalyst formed in a liquid vehicle from (1) aluminum, (2) titanium trichloride and (3) an activator therefor, the activator being iodine monochloride, and the initial molar ratio of aluminum to vanadium trichloride being in the range of from 0.2:1 to 30:1.

References Cited in the file of this patent
UNITED STATES PATENTS

| | | |
|---|---|---|
| 2,886,561 | Reynolds et al. | May 12, 1959 |
| 2,899,413 | Hagemeyer et al. | Aug. 11, 1959 |
| 2,899,416 | Schreyer | Aug. 11, 1959 |
| 2,959,576 | Payne | Nov. 8, 1960 |
| 2,970,133 | Sistrunk | Jan. 31, 1961 |

FOREIGN PATENTS

| | | |
|---|---|---|
| 1,132,506 | France | Nov. 5, 1956 |
| 1,147,868 | France | June 11, 1957 |
| 778,639 | Great Britain | July 10, 1957 |
| 794,785 | Great Britain | May 7, 1958 |
| 552,578 | Belgium | Sept. 1, 1957 |

OTHER REFERENCES

"Inorganic Chem." (Moeller), pub. by John Wiley and Sons, Inc. (New York), 1957, pp. 749–751.